(No Model.)
H. OGDEN.
BRACE FOR TELEGRAPH POLES.
No. 448,786. Patented Mar. 24, 1891.
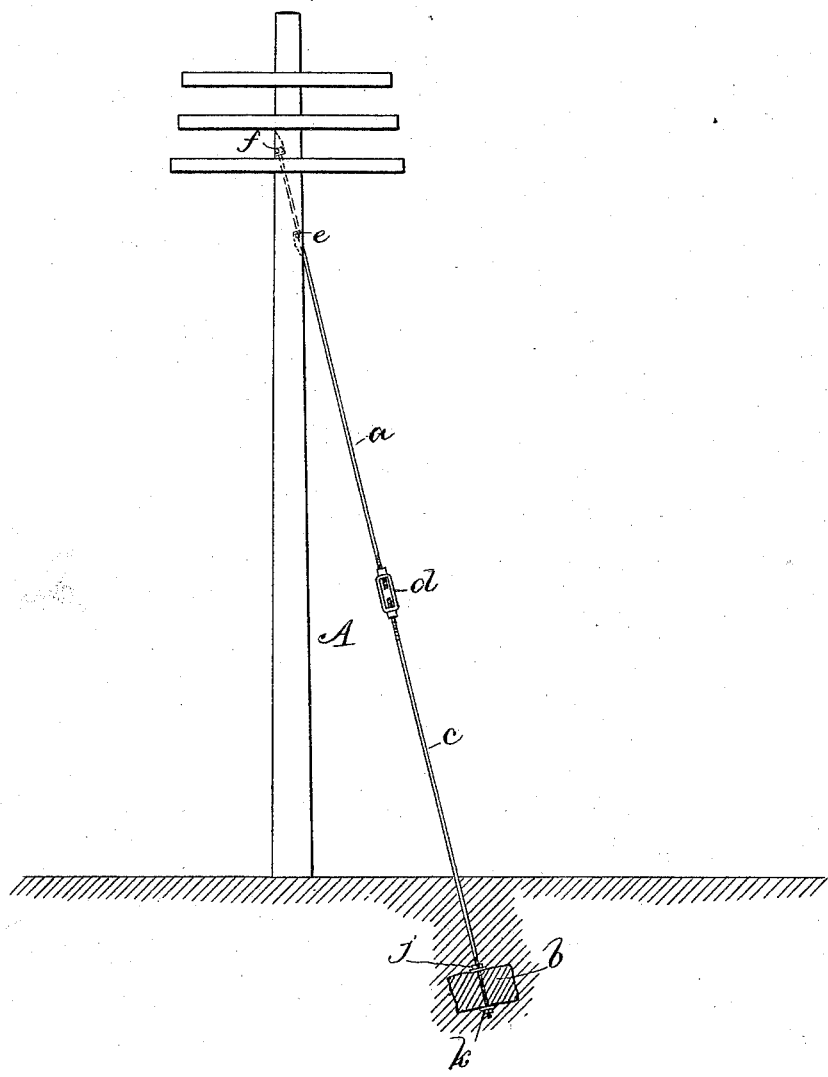
WITNESSES.
Robert Wallace.
C. E. Holte.
INVENTOR
Henry Ogden.
by Wm. R. Macleod
his atty

UNITED STATES PATENT OFFICE.

HENRY OGDEN, OF FALL RIVER, MASSACHUSETTS, ASSIGNOR OF ONE-HALF TO JAMES H. OGDEN, OF SAME PLACE.

BRACE FOR TELEGRAPH-POLES.

SPECIFICATION forming part of Letters Patent No. 448,786, dated March 24, 1891.

Application filed October 29, 1890. Serial No. 369,668. (No model.)

*To all whom it may concern:*

Be it known that I, HENRY OGDEN, of Fall River, county of Bristol, State of Massachusetts, have invented certain new and useful Improvements in Braces for Telegraph-Poles, of which the following is a specification, reference being had to the drawings accompanying and forming a part hereof, in which a telegraph-pole with my improvement attached is shown in elevation.

As is well known, telegraph-poles, especially in exposed places, are very apt to be thrown down by the force of the wind. This is a matter of serious inconvenience and causes the expenditure of a great deal of money, as also a considerable loss to telegraph companies, resulting not only from a loss of business while the wires are down, but from a loss of customers, who, being obliged to give their business at a certain time to another company become permanent customers of the latter.

My invention has for its object to produce a device by which a telegraph-pole may be securely set and held in a given position, so that it cannot be thrown down by any ordinary force applied to it from any direction; and it consists in an adjustable brace secured at one end to the upper portion of the pole and anchored in the ground near the base of the pole, all as hereinafter set forth, and as is more particularly pointed out in the claims, which are appended hereto and made a part hereof.

The invention will be readily understood from the following description, in which reference is made to the accompanying drawings.

A is the telegraph-pole.

*a* is the upper portion, and *c* the lower portion, of the brace, the adjacent ends of these parts being screw-threaded and adjustably connected or secured together by means of a right and left hand adjusting-nut or turn-buckle *d*, by means of which the brace may be lengthened or shortened after it is in position. The upper portion *a* of the brace passes, preferably, through the upper portion of the pole A, and is provided with nuts *e f*, one on either side of the pole, and which serve to secure the brace rigidly to the pole. The lower end of the lower portion *c* of the brace passes through a log or stringer *b* of wood, which is laid in the ground, preferably three or four feet below the surface and serves to securely anchor the lower end of the brace. Nuts similar to those shown at *e f*, and which are shown at *j k*, are placed on the lower end of the brace on either side of the anchor *b* for the purpose of securing the brace firmly to the anchor. A piece of wood similar to an ordinary railway-track tie has been found suitable for use as an anchor-piece, such as is shown at *b*. The brace is preferably of metal and should be rigid and heavy enough to prevent buckling when the tendency of the pole is to fall toward the brace. By setting such a brace tightly the pole is so stiffened as to resist successfully, even when heavily loaded, any ordinary strain, such as telegraph-poles are subjected to. The precise position of the brace relatively to the pole is not important and would depend in a given case on the position and surroundings of the pole.

What I claim is—

1. The combination, with a telegraph-pole, of a rigid two-part brace attached at one end to the upper part of said pole and having the adjacent ends of its two parts screw-threaded, a nut or turn-buckle adjustably connecting said parts, and an anchoring-piece *b*, set in the ground near the base of said pole and to which the lower end of said brace is secured.

2. The combination, with the telegraph-pole A, of the rigid two-part brace *a c*, having its adjacent ends screw-threaded and provided at its upper end with the nuts *e f*, by which it may be rigidly but adjustably attached to the said pole, and having, also, the nuts *j k* near its lower end, the nut or turn-buckle *d*, adjustably connecting the two parts of said brace, and the anchoring-piece *b*, as set forth.

HENRY OGDEN.

Witnesses:
WM. A. MACLEOD,
ROBERT WALLACE.